United States Patent [19]
Smith et al.

[11] Patent Number: 5,823,629
[45] Date of Patent: Oct. 20, 1998

[54] ARTICULATING TRAILING TAG AXLE

[75] Inventors: Fred T. Smith; Fred P. Smith, both of Alpine, Utah; Brooks Strong, 11214 Lorton Dr., Houston, Tex. 77070; William R. Johnson, American Fork, Utah

[73] Assignee: Brooks Strong, Houston, Tex.

[21] Appl. No.: 365,838

[22] Filed: Dec. 29, 1994

[51] Int. Cl.$^6$ .............................. B60G 17/056; B60P 1/16
[52] U.S. Cl. ......................... 298/23 R; 180/209; 280/704
[58] Field of Search ........................... 180/209; 280/704; 298/22 R, 23 R, 23 M, 23 A

[56] References Cited

U.S. PATENT DOCUMENTS

| | | | |
|---|---|---|---|
| 3,161,418 | 12/1964 | Brennan et al. | 180/209 X |
| 4,848,783 | 7/1989 | Christenson et al. | 280/704 X |
| 5,407,251 | 4/1995 | Ritchie, II et al. | 298/23 MD |

FOREIGN PATENT DOCUMENTS

| 1017767 | 9/1977 | Canada | 180/209 |
|---|---|---|---|

*Primary Examiner*—Michael S. Huppert
*Assistant Examiner*—Janice L. Krizek

[57] ABSTRACT

First hydraulic drives (e.g. cylinders, pistons) and lift arms attached to dump truck side panels, preferably reinforced, move a trailing tag axle, and wheels supported by the tag axle, between operative and storage positions without bending the truck frame. A linkage assembly and second hydraulic drives (e.g. cylinders, pistons) coupled to the lift arms and the first hydraulic drives move the tag axle and the wheels between raised and lowered positions. In the operative positions of the lift arms and the tag axle, the wheels contact the ground and, because of the first hydraulic drive construction, move smoothly over road bumps and into road dips. In their storage position, the lift arms are disposed above and to the rear of the dump truck with the trailing tag axle and the wheels above the body but lowered to minimize their height above the truck. With the lift arms and the tag axle in the storage position, the second hydraulic drives initially move the tag axle, and then the first hydraulic drives move the lift arms, to move the tag axle to the operative position. With the lift arms and the trailing tag axle in the operative position, the lift arms, and the tag axle, are moved to position the tag axle at the storage position. With the lift arms and the tag axle in the storage position, the truck load can be dumped without obstruction. Furthermore, the force for moving the tag axle is minimal when the lift arms are in the storage position.

38 Claims, 8 Drawing Sheets

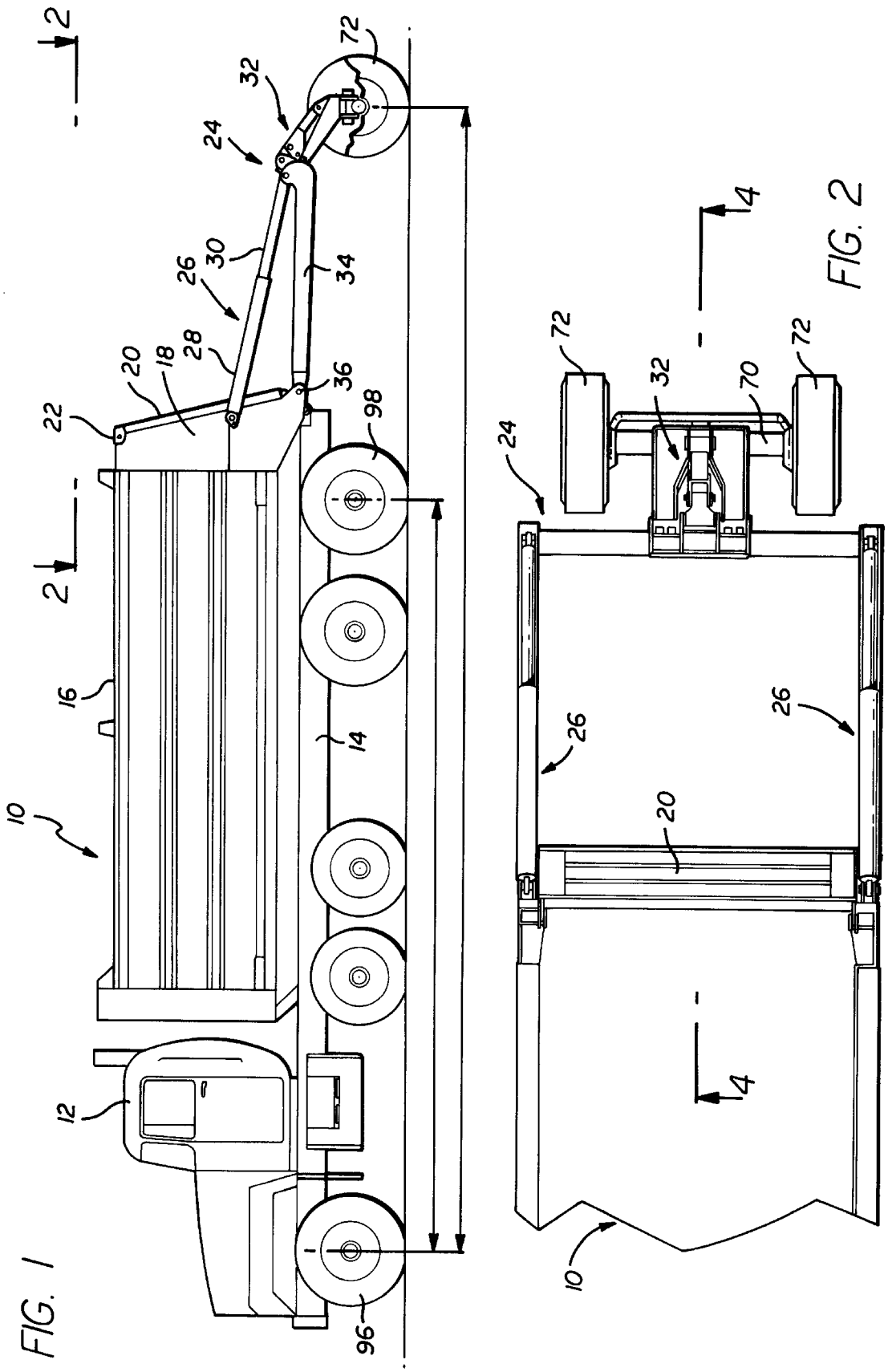

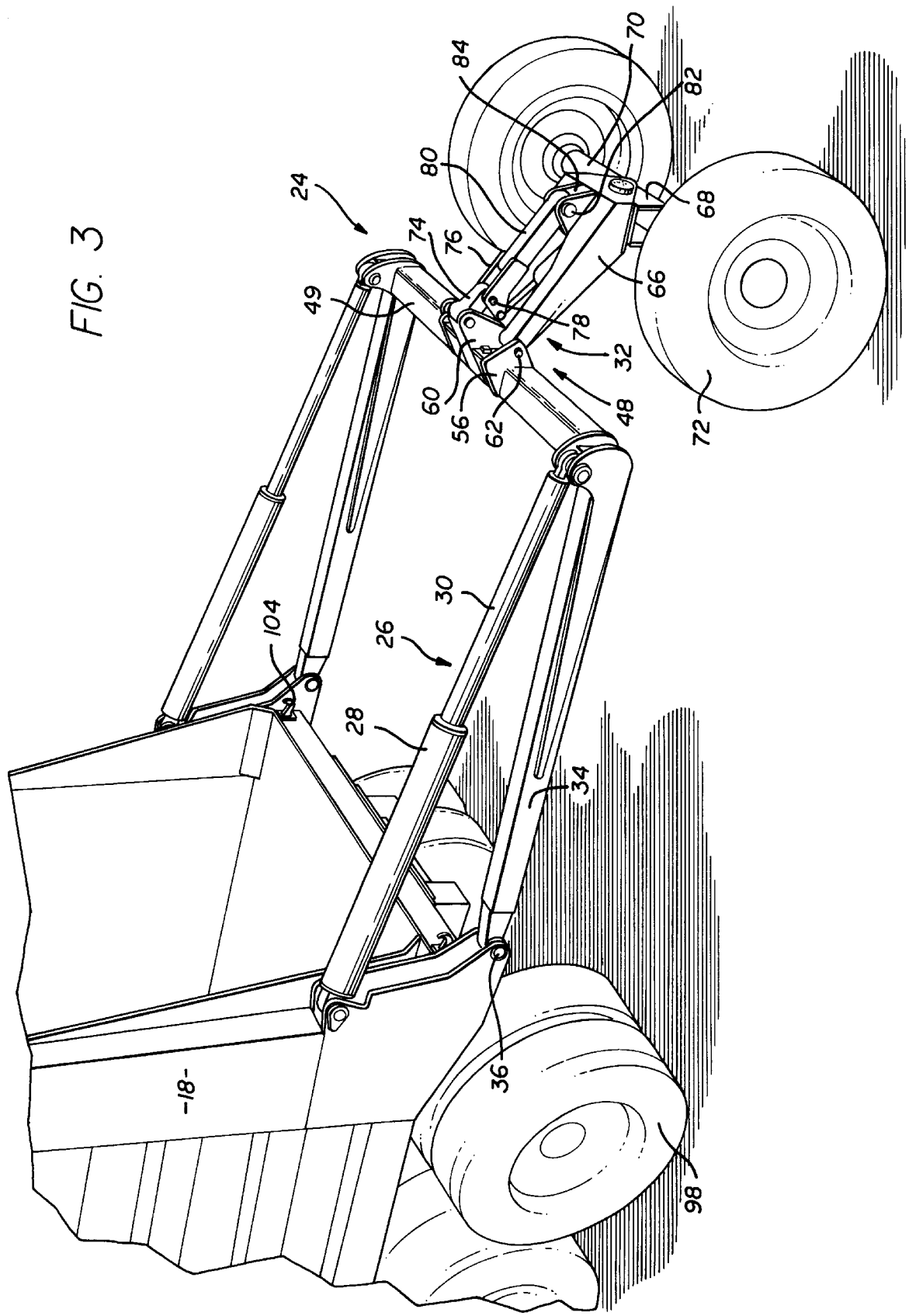

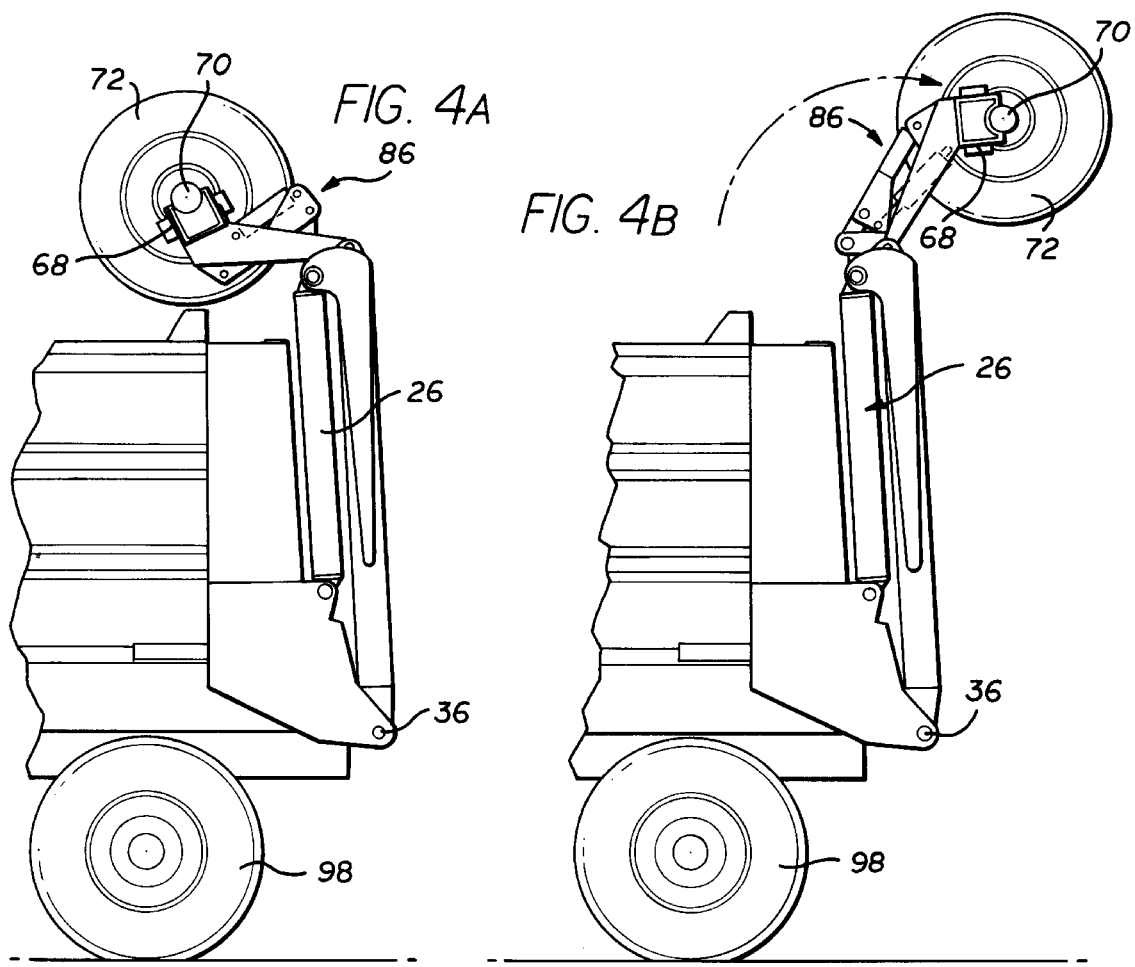
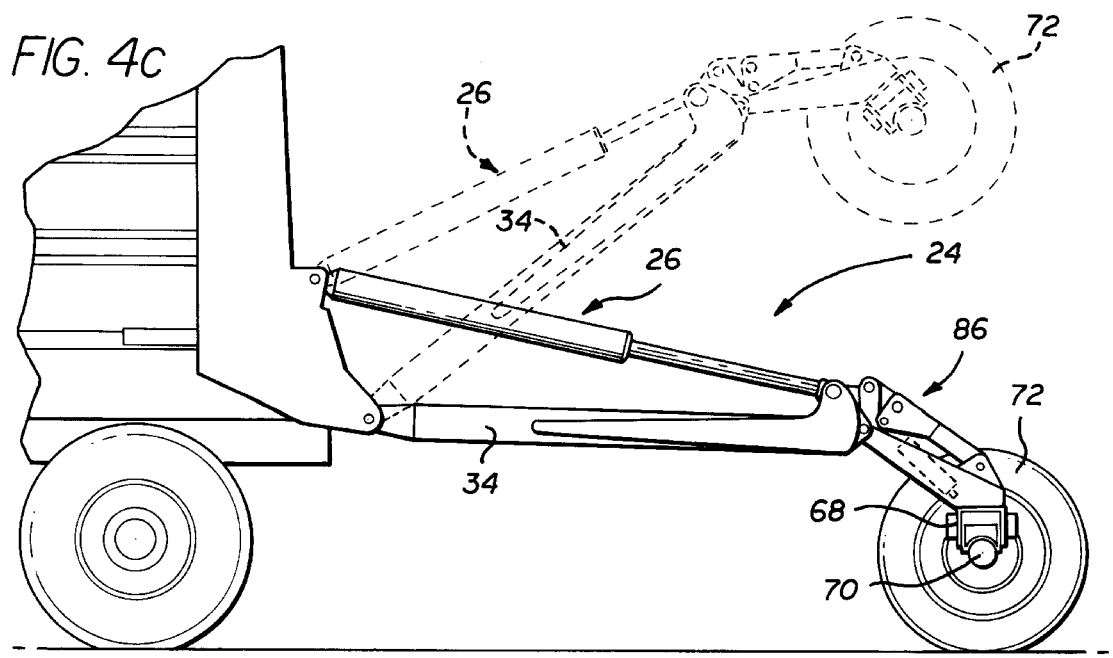

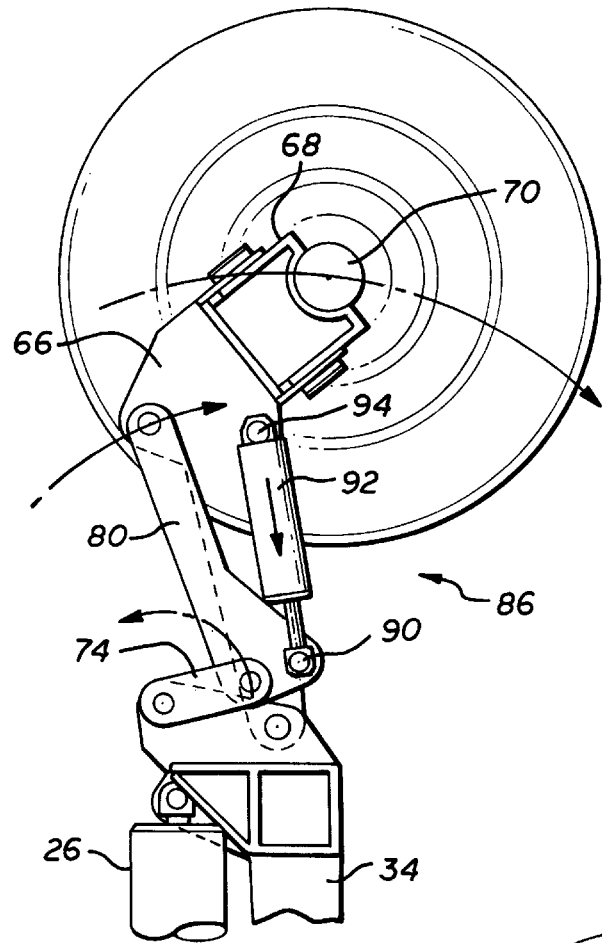
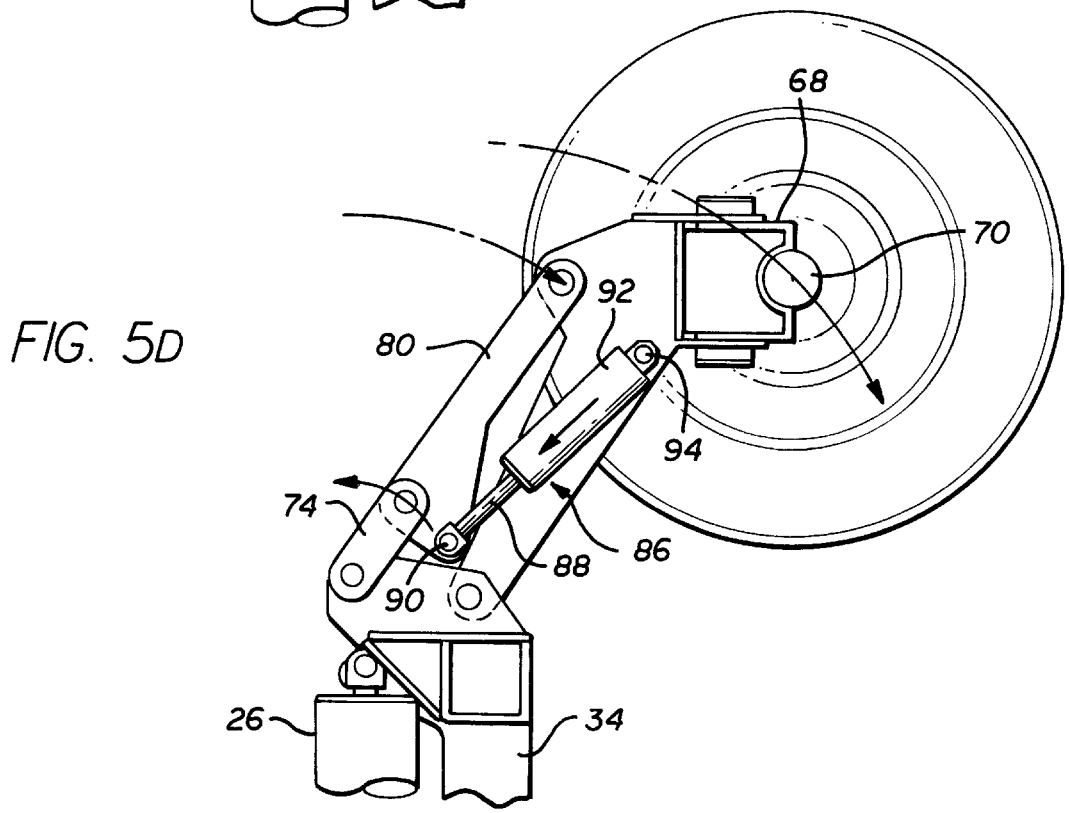
FIG. 5c
FIG. 5D

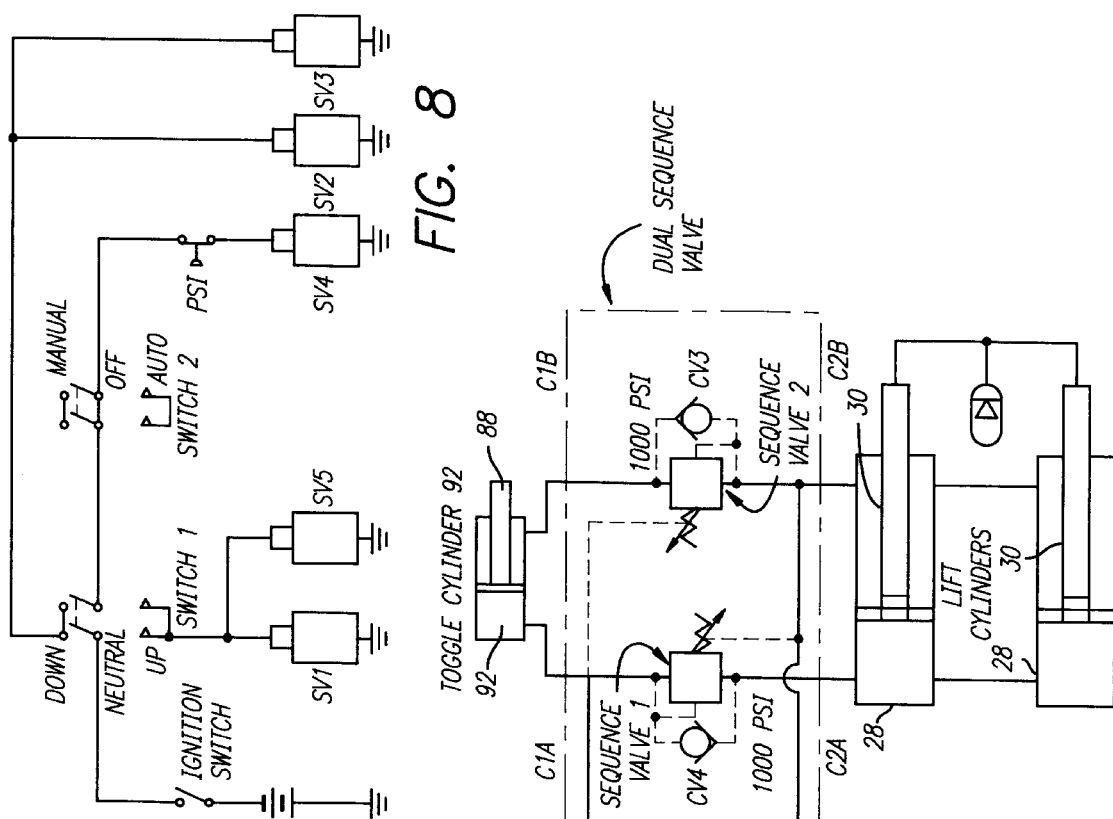
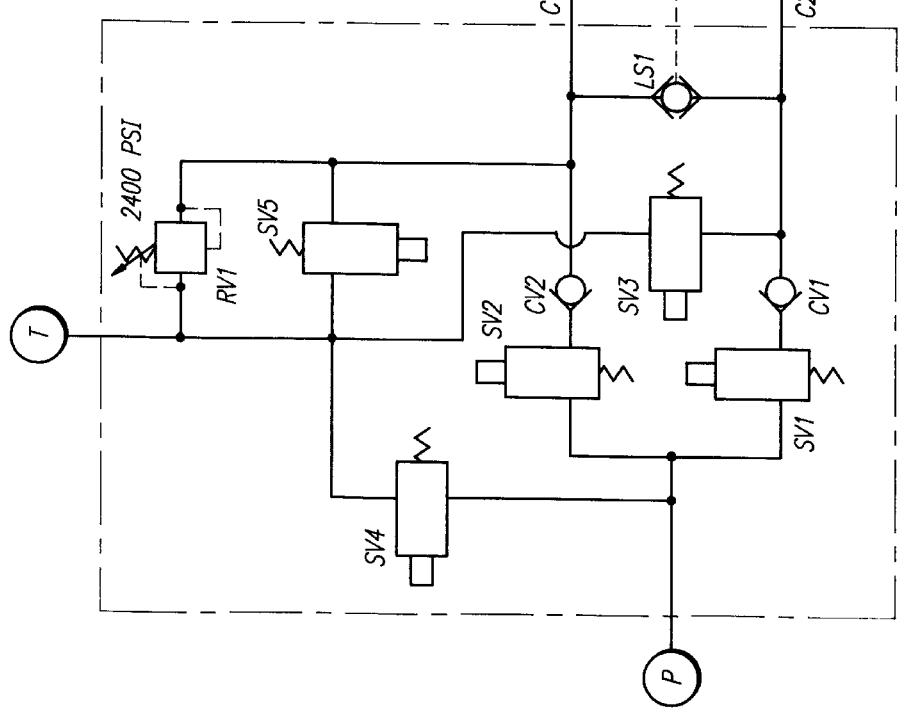

ARTICULATING TRAILING TAG AXLE

This invention relates to a trailing tag axle for attachment to a dump truck to increase the load that the dump truck can legally carry while travelling along a road. More particularly, the invention relates to a trailing tag axle which is attached to a dump truck to provide a maximal load in the dump truck during the movement of the dump truck along a road and to provide for a dumping of the load from the dump truck without any obstruction when the dump truck reaches its destination.

Dump trucks have been in use for many years. The dump trucks have a frame and a hollow body disposed on the frame. A tailgate is disposed on the body at the rear end of the body and is movable between a closed position and an open position. In the closed position, the tailgate defines an enclosure with the body to retain the load in the body. In the open position, the tailgate opens the rear end of the dump truck to provide for the dumping of the load from the body. To facilitate the dumping of the load from the body, the front of the body may be tilted upwardly relative to the frame so that the load will flow by gravity from the rear end of the body.

Truckers always desire to carry the maximum load possible. However, the truckers have been restricted by governmental regulations in the amount of load that the trucks can carry. These restrictions have been provided to prevent the road or bridge from becoming damaged, such as by cracking, as a result of the imposition of excessive loads on the road or bridge. The governmental restrictions have been based upon the longitudinal distance between the front and rear wheels in the dump truck. As will be appreciated, the maximum load imposed by governmental regulations in a dump truck can be increased in accordance with increases in the distance between the front and rear.

In order to increase the weight of the load capable of being carried by a dump truck, trailing tag axle assemblies have been attached to the dump trucks at the rear ends of the dump trucks. Each trailing tag axle assembly has a trailing tag axle at the rear end of the assembly. Wheels are attached to the trailing tag axle. In one position of the trailing tag axle assembly, the wheels are disposed on the road. This increases the effective length over which the weight of the load in the dump truck can be distributed. As a result, the dump truck can move along the road with an increased load weight without damaging the road or bridge.

When the dump truck reaches its destination, the dump truck body is pivoted in a direction relative to the frame so that the front end of the body is raised relative to the rear end of the frame. The tailgate is concurrently raised to open the truck body at the rear end of the truck body so that the load in the truck body can become deposited by gravity on the ground or in one of many types of road equipment (i.e. spreaders, wideners, etc.). Concurrently with the opening of the tailgate (or preferably before the tailgate is opened and the body is raised), the trailing tag axle assembly is raised so that the load dropping to the ground will not cover the tag axle assembly. It is undesirable for several reasons for the load to flow on the tag axle assembly. For example, the load may damage the trailing tag axle assembly. Furthermore, the load may be sticky so that it becomes bonded, sometimes permanently, to the trailing tag axle assembly. This may inhibit any proper operation of the trailing tag axle assembly subsequently.

There are several disadvantages to the trailing tag axle assemblies now in use. One disadvantage is that the trailing tag axle is generally attached to the frame of the truck chassis. Because of this, there is a tendency for the chassis frame to become bent or buckled when the trailing tag axle assembly is in the operative (or lowered) position. The bending or buckling of the dump truck frame has limited the life of the dump truck. To overcome this, the frame has sometimes been strengthened. However, this has increased the weight of the dump truck and has limited the weight of the load that can be added to the truck by the inclusion of the trailing tag axle assembly.

Another disadvantage to the trailing tag axle assemblies now in use has been that the tag axle assemblies obstruct the flow of the load from the truck body when the front of the truck body has been pivoted upwardly and the tailgate has been opened. This has resulted from the fact that the trailing tag axle assembly has been attached to the frame at an intermediate position between the opposite lateral sides of the frame. Thus, the attachment of the trailing tag axle assembly to the frame obstructs the flow of the load from the truck body even when the trailing tag axle assembly is raised.

There are also other significant disadvantages to the trailing tag axle assemblies now in use. This partially results from the fact that the height of the trailing tag axle assembly in the raised position exceeds government regulations when the trailing tag axle assembly is attached directly to the rear end of the frame. To overcome this governmental regulation, the length of the trailing tag axle assembly has been shortened, or the truck frame has been extended to the rear of the truck. However, shortening the trailing axle assembly has reduced the amount of the additional weight that can be carried by the dump truck as a result of the addition of the trailing tag axle assembly and extending the truck frame has made it difficult or impossible to dump into some types of paving equipment.

Another significant disadvantage exists in the trailing tag axle assemblies now in use. Thus results from the inability of the trailing tag axle assembly to respond smoothly and efficiently to bumps and dips in the road while the wheels on the trailing tag axle are disposed on the road and the dump truck is travelling along the road. This has affected the smoothness in the ride of the dump truck while the dump truck is travelling along the road. This has also affected the life of trailing axle assemblies now in use. This results from the fact that, as the truck travels through a dip in the road, the forces and stresses on the trailing axle assembly are significantly increased.

Another disadvantage in the dump trucks now in use has been that the support structure for the trailing tag axle assembly extends from the rear end of the dump truck. Under some circumstances, this may constitute a dangerous appendage that does not conform to government regulations. A further disadvantage has been that the trailing tag axle assemblies have had to be raised in order for the dump truck to back up. This has caused the dump truck to be overweight during such backing-up movement and to exceed governmental regulations when the load in the dump truck has been increased because of the attachment of the trailing tag axle assembly. A further disadvantage has been that the appendages of the prior art have made it difficult or even impossible to dump a load into some types of paving machines.

This invention provides a trailing tag axle assembly which overcomes the disadvantages specified above. The trailing tag axle assembly is attached to the truck body such that the truck frame does not bend or buckle away from the body even when the trailing tax axle assembly is raised or lowered. The trailing tag axle assembly is attached to the side panels of the dump truck so that the full length of the tag axle assembly can be used in distributing the weight of the load in the dump truck. The tag axle assembly does not obstruct the flow of the load from the dump truck in the raised position of the trailing tag axle assembly. Furthermore, the effective length of the trailing tag axle assembly is shortened in the raised position of the trailing tag axle assembly so that the height of the tag axle assembly is within governmental regulations. The trailing tag axle assembly is also constructed to respond smoothly and efficiently to bumps and dips in the road while the dump truck is travelling along the road. This results from the fact that the force variations are minimized as the truck travels through bumps and dips in the road. In one embodiment, the dump truck can be moved in reverse with the wheels of the trailing tag axle assembly disposed on the road, thereby providing for the operation of the dump truck within governmental regulations.

In one embodiment of the invention, first hydraulic drives (e.g. cylinders, pistons) and lift arms attached to side panels, preferably reinforced, of a dump truck move a trailing tag axle between operative and storage positions without bending the truck frame. A linkage assembly and second hydraulic drives (e.g. cylinders, pistons) coupled to the lift arms and the trailing tag axle move the trailing tag axle, and wheels supported (preferably pivotably) by the trailing tag axle, between operative and storage positions.

In the operative position of the lift arms and the trailing tag axle, the wheels contact the ground and, because of the first hydraulic drive construction, move smoothly over bumps and into dips in the road. In the storage position of these members, the lift arms are disposed above the dump truck with the trailing tag axle and the wheels lowered relative to the lift arms to minimize their height above the truck.

With the lift arms and the trailing tag axle in the storage position, movement is initially provided by the second hydraulic drives to the trailing tag axle, and then by the first hydraulic drives to the lift arms, to move the tag axle to the operative position. With the lift arms and the tag axle in the operative position, movements are initially provided to the lift arms and then to the tag axle to position the tag axle at the storage position. When the lift arms and the tag axle are in the storage position, the load in the truck can be dumped without any obstruction. Furthermore, the force for moving the tag axle is minimal when the lift arms are in the storage position.

In the drawings:

FIG. 1 is a side elevational view of a dump truck and a tag axle assembly constituting one embodiment of this invention, the tag axle assembly being shown as being attached to the dump truck and disposed in the extended position with wheels in the tag axle assembly disposed on the ground;

FIG. 2 is a sectional view of the dump truck and the tag axle assembly substantially on the line 2—2 of FIG. 1 and shows the tag axle assembly in a lowered position;

FIG. 3 is an enlarged perspective view of the tag axle assembly shown in FIGS. 1 and 2 and of the rear end of the dump truck with the tag axle assembly attached to the dump truck and with the wheels in the tag axle assembly disposed on the ground;

FIG. 4A is a sectional view taken substantially on the line 4—4 of FIG. 2 and shows the tag axle assembly in the raised position relative to the rear of the dump truck, with the tag axle and the wheels on the tag axle lowered to minimize the vertical height of the tag axle assembly above the ground;

FIG. 4B is a sectional view taken substantially on the line 4—4 of FIG. 2 and shows the tag axle and the wheels pivoted to a raised position from the lowered position shown in FIG. 4A;

FIG. 4C is a sectional view taken substantially on the line 4—4 of FIG. 2 and shows in solid lines the position of the tag axle assembly relative to the rear of the dump truck with the wheels in the tag axle assembly on the ground and also shows the tag assembly in broken lines at a position between the positions shown in FIG. 4B and in solid lines in FIG. 4C;

FIG. 5C is an enlarged side elevational view of the tag axle assembly at a position between the position shown in FIG. 5B and the position shown in FIG. 4B;

FIG. 5D is an enlarged side elevational view of the tag axle assembly in the position also shown in FIG. 4B;

Figure 10:
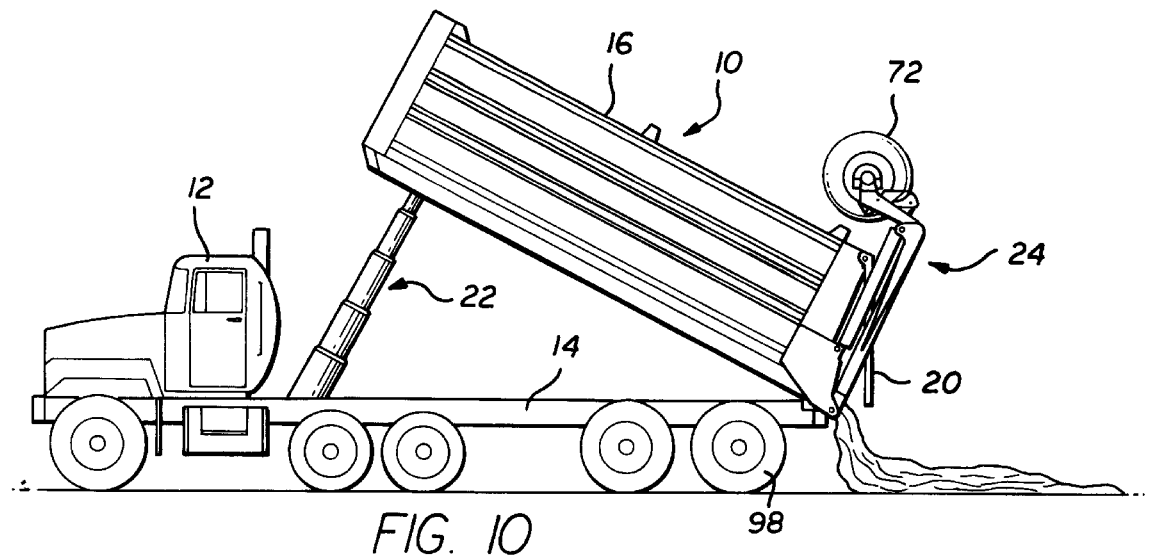
Figure 11:
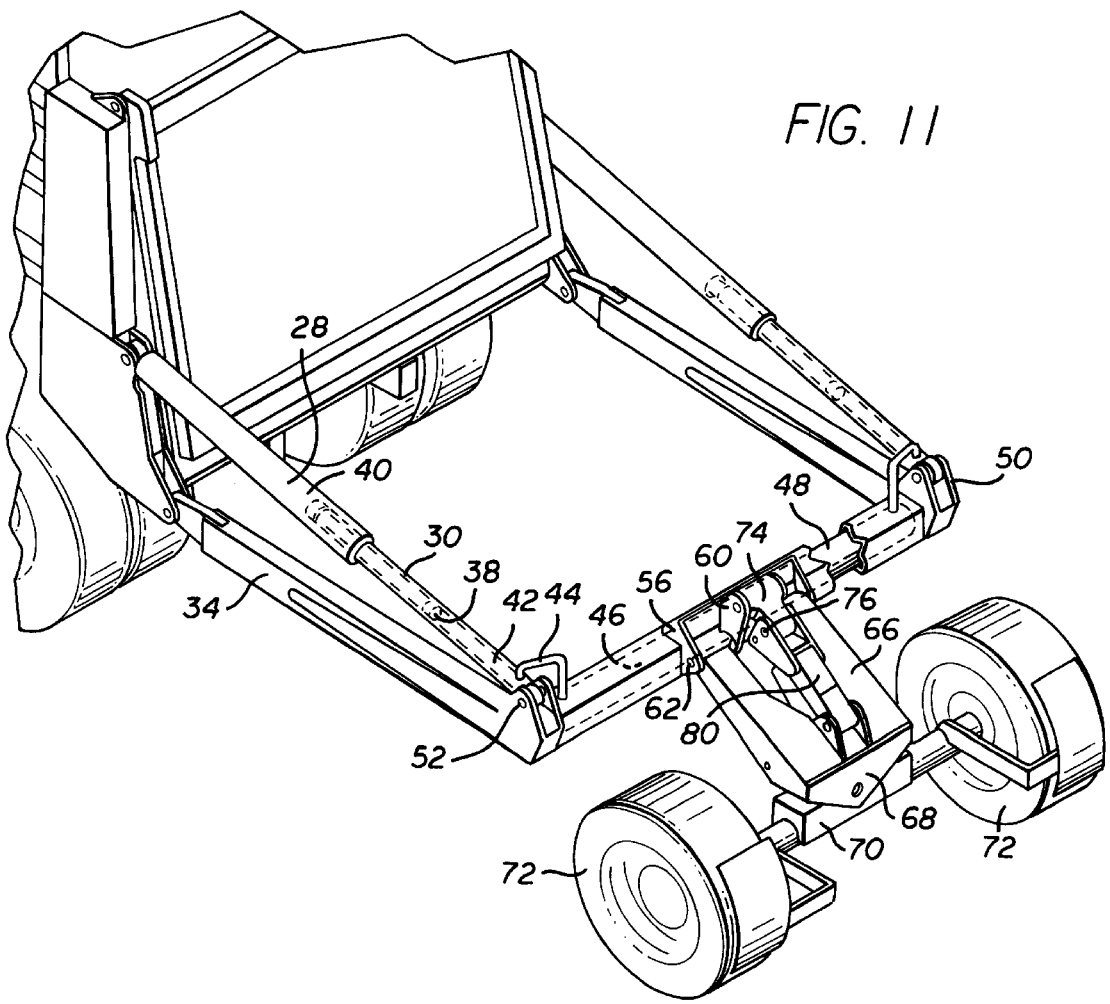

FIG. 8 is a schematic diagram of the electrical circuitry which is used in conjunction with the tag axle assembly shown in the previous figures to provide a movement of the tag axle assembly between the operative and storage positions; and FIG. 9 is a schematic diagram of the hydraulic circuitry which is used in conjunction with the trailing tag axle assembly shown in the previous Figures to provide a movement of the trailing tag axle assembly between the operative and storage positions;

FIG. 10 is a side elevational view of the dump truck and the trailing tag axle assembly with the trailing truck body pivotably raised at the front end relative to the truck frame to provide for a dumping of the load in the truck body;

FIG. 11 is a perspective view of the trailing tag axle assembly and shows features in the trailing tag axle assembly for providing a smooth and efficient movement of the wheels on the trailing tag axle over bumps and into dips in the road while the dump truck is travelling along the road.

In one embodiment of the invention, a dump truck generally indicated at 10 (FIGS. 1 and 3) is provided with a cab 12, a frame 14, a truck body 16 and side panels 18, the side panels defining the lateral extremities of the truck body. The side panels 18 may be reinforced for the purposes of this invention. A tailgate 20 may be provided at the rear end of the dump truck 10. The tailgate 20 may be movable between a closed position and an open position. In the closed position, a load in the truck body 16 is prevented from leaving the truck body. In the open position of the tailgate 20, the load in the truck body 16 is able to leave the truck body through the rear end of the truck body. The flow of the load from the truck body 16 is facilitated by pivoting the front end of the truck body upwardly on a plurality of collapsible stanchions, generally indicated at 22 in FIG. 10, the fulcrum being near the rear end of the dump truck. The construction of the dump truck as described above may be considered to be known in the art except for the reinforced side panels 18.

A trailing tag axle assembly generally indicated at 24 (FIGS. 1 and 3) is attached to the side panels 18 at the rear end of the dump truck. The tag axle assembly includes first hydraulic drives generally indicated at 26. The hydraulic drives 26 may include hydraulic cylinders 28 pivotally attached to the side panels 18 at the rear of the side panels intermediate the height of the side panels. The first hydraulic drives 26 also include hydraulic rods 30 disposed within the cylinders 28 at one end and attached at the other end to lift arms 34. Lift arms 34 are pivotably attached at one end to pivot pins 36 on the side walls 18 and at the other end to the linkage assembly 32.

The attachment of the lift arms 34 and the cylinders 28 to the side panels 18 of the dump truck 10 rather than to the frame 14 offers certain advantages. The side panels 18 have a large area between the front and rear of the dump truck 10. Because of this, any weight imposed by the hydraulic drives 26 and the lift arms 34 and by the trailing tag axle assembly 24 attached to the hydraulic drives and the lift arms is distributed over the wide areas provided by the side panels 18. As a result, the frame 14 does not become bent or bowed away from the body 16 when the hydraulic drive means 26 and the lift arms 34 are pivoted between raised and lowered positions.

The cylinders 28 are filled with hydraulic oil. As shown in FIG. 11, the rods 30 are preferably hollow. Closed hollow pistons 38 are disposed within the rods 30 and are filled with a suitable hydraulic oil 40. A suitable gas 42 such as nitrogen is disposed in the rods 30 to the rear of the pistons 38. The gas 42 in the rods 30 communicates through conduits 44 with gas 46 such as nitrogen in an accumulator, generally indicated at 48, which is included in the linkage assembly tube on the end of the lift arms 34. The accumulator 48 is inside a support tube 49 which supports brackets 50 at its opposite ends. The brackets 50 on the ends of the lift arms 34 have pins 52 which receive the rods 30 for pivotable movement.

A pair of brackets 56 (FIG. 3) are attached to the support tube 49 at spaced positions near the middle of the support tube. Disposed in the area between the brackets 56 is a second pair of brackets 60. A pin 62 attached to the brackets 56 extends through the brackets 56 and 60 to support a pair of arms 66 at one end of the arms. The arms 66 are attached at the other end to a beam 68 which is in turn attached to an axle 70. Wheels 72 are suitably disposed on the axle 70.

A short linkage 74 is pivotably mounted at one end on the brackets 60. At its opposite end, the short linkage 74 is pivotably attached as by brackets 76 and pivot pins 78 to one end of a long linkage 80. The opposite end of the long linkage 80 is pivotably mounted as at 82 to a pair of spaced brackets 84 which are supported by the arms 66. A second hydraulic drive generally indicated at 86 (FIGS. 5B–5D) is provided to pivot the linkages 74 and 80 relative to each other. The second hydraulic drive 86 includes a piston 88 pivotably attached to the long linkage 80 as at 90 and also includes a cylinder 92 pivotably attached as at 94 to the beam 68.

The trailing tag axle 70 has three (3) different positions as shown in FIGS. 4A–4C. In one of these positions (FIGS. 1, 3 and 5D), the trailing tag axle 70 is disposed as shown in FIG. 1 such that the wheels 72 are disposed on the ground. In this position, the longitudinal distance between the front wheels 96 on the dump truck 10 and the wheels 72 is considerably increased relative to the distance between the front wheels 96 and the rear wheels 98 on the dump truck. Because of this significant increase in the longitudinal distance when the wheels 72 contact the ground, the load carried in the truck body 16 can be considerably increased while the dump truck is travelling along a road.

Figure 6:
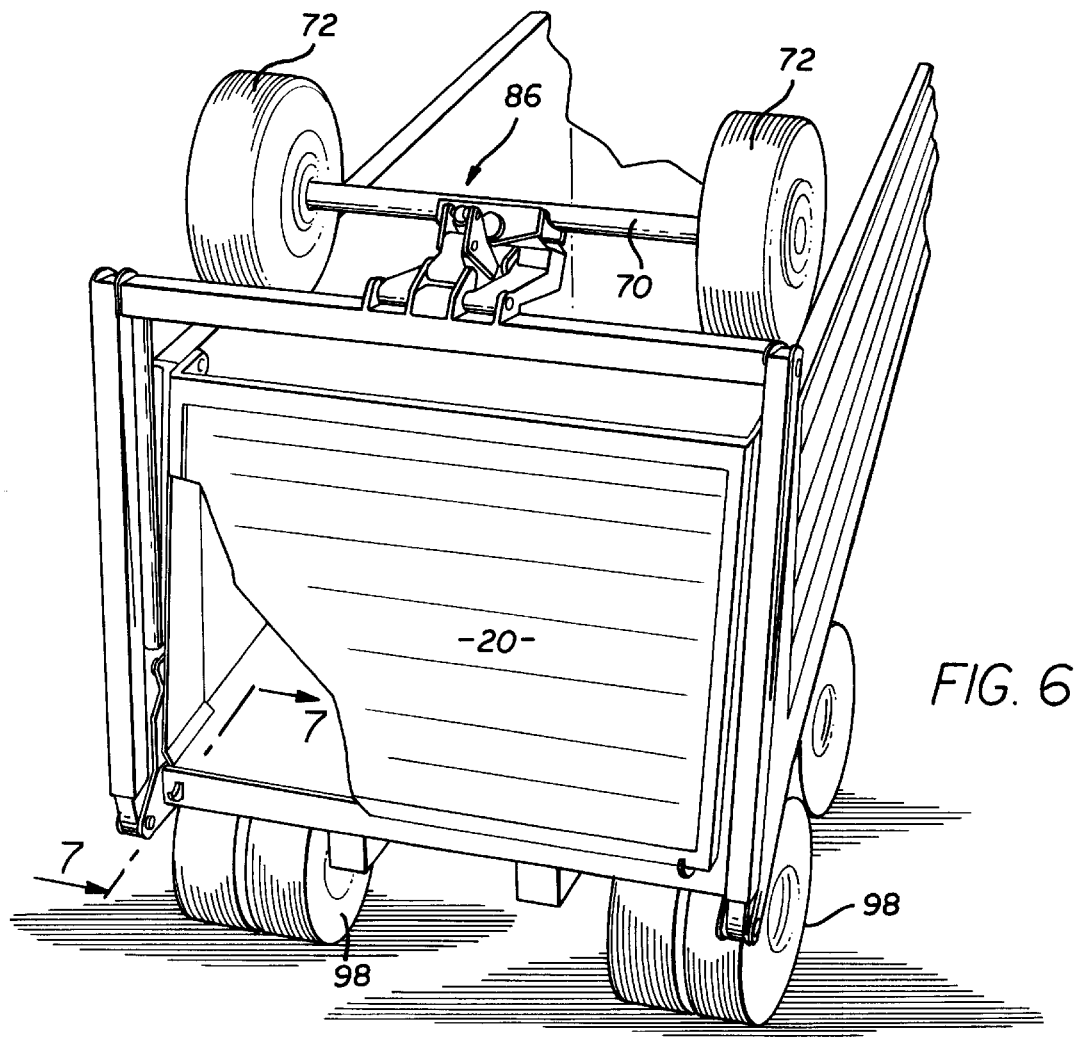
FIG. 6 is an enlarged perspective view of the rear end of the dump truck, of a tailgate at the rear end of the tag axle assembly and of the tag axle assembly in the raised position and shows a portion of the tailgate broken away.

The trailing tag axle 70 has a second position in which the trailing tag axle is disposed above the dump truck. This is shown in FIG. 4A. When the trailing tag axle 70 is disposed above the dump truck 10, the tailgate 20 can be opened to provide for the dumping of the load in the truck body 16. As will be seen in FIG. 6, the linkage assembly 32 is disposed above the truck body 16, and the hydraulic drives 26 and the lift arms 34 are disposed at the opposite lateral ends of the truck body 16. As a result, the opening at the rear end of the truck body 16 with the tailgate 20 open is not obstructed in any way so that the load in the truck body is able to flow freely out of the truck body to the ground. The flow of the load out of the truck body to the ground is facilitative by tilting the front end of the truck body 16 on telescopic stanchions 22 as shown in FIG. 10.

The trailing tag axle 70 and the wheels 72 are shown in a third position in FIGS. 4B and 5D. This position occurs after the rod 30 has been contracted into the cylinder 28 to raise the hydraulic drives 26 and the lift arms from the operative position shown in FIGS. 1 and 3 to the storage position shown in FIGS. 4A, 4B, and 6. However, as shown in FIG. 4B, the axle 70 and the wheels 72 extend a significant distance above the hydraulic drives 26 and the lift arms 34. This is undesirable in view of governmental restrictions that limit the height of trailing tag axle assemblies above the ground. These governmental restrictions are partially imposed to provide free passage of the dump trucks through underpasses of bridges when the dump trucks are travelling with a light load or no load and with the hydraulic drives 26 and the lift arms 34 raised.

Figure 5A:
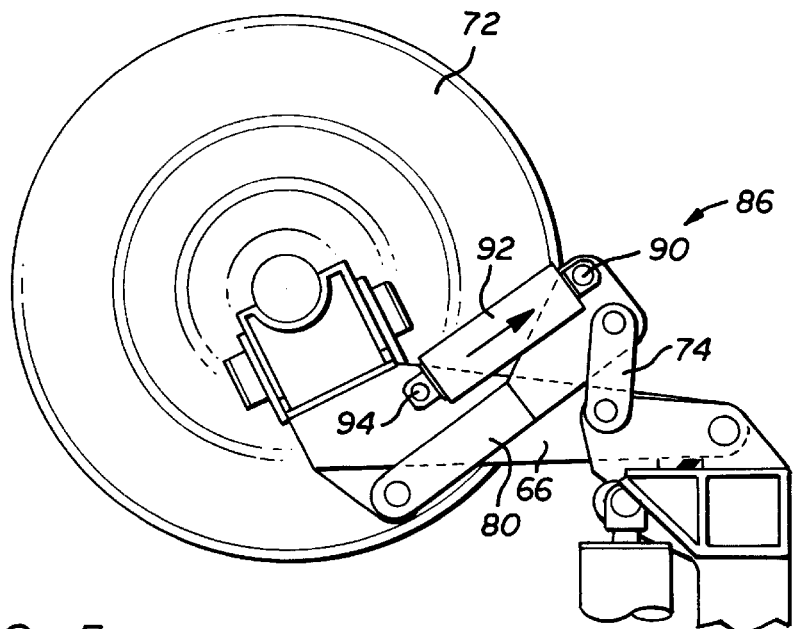
FIG. 5A is an enlarged side elevational view of the tag axle assembly in the position also shown in FIG. 4A.
Figure 5B:
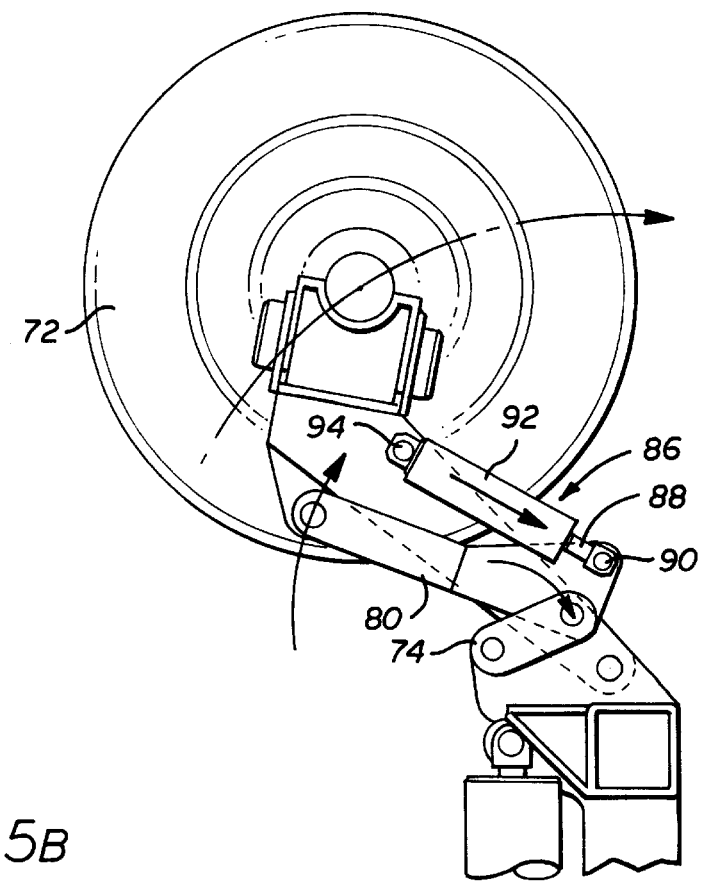
FIG. 5B is an enlarged side elevational view of the tag axle assembly in a position between the position shown in FIGS. 4A and 5A and the position shown in FIG. 4B.

The trailing tag axle 70 and the wheels 72 are shown in FIGS. 4A and 5A in a position corresponding to the second position described above. In this position, the trailing tag axle 72 and the wheels 70 have been retracted downwardly from the position shown in FIGS. 4B and 5C. In the position shown in FIGS. 4A and 5A, the height of the trailing tag axle 70 and the wheels 72 above the truck body 16 is minimized. In this way, the trailing tag axle assembly 24 of this invention is able to meet governmental regulations. Furthermore, the trailing tag axle assembly 24 is protected in this position since it is disposed forwardly above the truck body 16. When the trailing tag axle assembly 24 is in this position, it does not interfere with the dumping of the load into road equipment.

When the trailing tag axle 70 and the wheels 72 are in the position shown in FIGS. 4A and 5A, the center of gravity of the trailing tag axle and the wheels and the associated members such as the hydraulic drive means 86 and the linkages 74 and 80 is relatively close to the pivot point of the hydraulic drive means 86. This tends to minimize the force required to be provided by the hydraulic drive means 86 to move the tag axle 70 and the wheels 72 from the position shown in FIGS. 4A and 5A to the position shown in FIGS. 4B and 5D.

When the dump truck is dumping its load, the trailing tag axle 70 and the wheels 72 are in the position shown in FIGS. 4A and 5A. To position the axle 70 so that the wheels 72 contact the ground, the second hydraulic drive 86 is operated to extend the piston 88 from the cylinder 92. This is shown progressively in FIGS. 5A, 5B, 5C and 5D. As the piston 88 is extended from the cylinder 92, the long linkage 80 is pivoted relative to the short linkage 74 so that the short linkage and the long linkage become progressively aligned relative to each other. When the long linkage 80 and the short linkage 74 become aligned relative to each other as shown in FIG. 5D, relatively little force is required by the hydraulic drive 86 to maintain the linkages in aligned relationship. This is important since this is the relationship which exists when the wheels 72 contact the ground.

After the axle 70 and the wheels 72 have reached the position shown in FIGS. 4B and 5D, the hydraulic drives 26 are operated to extend the rods 30 from the cylinders 28. When this occurs, the hydraulic drives 26 and the lift arms 34 pivot downwardly from the position shown in FIG. 4B to the position shown in FIGS. 1 and 3. In this position, the wheels 72 engage the ground. While the hydraulic drives 26 and the lift arms 34 pivot downwardly, the trailing tag axle 70 and the wheels 72 remain in the positions shown in FIGS. 4B and 5D.

With the wheels 72 contacting the ground, the dump truck 10 is able to travel along the road. As the dump truck 10 travels along the road, it may encounter bumps rising from the road and dips (e.g. potholes) extending into the road. The arrangement shown in FIG. 11 compensates for these bumps and dips. This results from the pneumatic coupling between the rods 30 and the accumulator 48 through the conduits 44. For example, as the rods 30 extend from the cylinders 28, the gas (e.g. nitrogen) in the rods flows from the accumulator 48 through the conduits 44 into the rods 30. Similarly, as the rods 30 move into the cylinders 28, the gas returns to the accumulator 48 through the conduits 44. In this way, the trailing tag axle assembly 70 and the wheels 72 are able to compensate in their movement for bumps and dips in the road. This provides for a smooth movement of the dump truck 16 and the trailing tag axle assembly 24 along the road. This results from the fact that the accumulator 48 provides a large reservoir in comparison to the amount of gas flowing into the rods. Thus, any pressure increases or decreases in the accumulator 48 are minimized.

When it is desired to move the trailing tag axle 70 and the wheels 72 from the operative position to the storage position, the hydraulic drives 26 are initially operated to move the trailing tag axle and the wheels to the position above the dump body (FIG. 4B). The hydraulic drives 26 and the lift arms 34 are then in the storage position. The hydraulic drive 86 then sequences to move the trailing tag axle 70 and the wheels 72 from the intermediate position shown in FIGS. 4B and 5D to the storage position shown in FIGS. 4A and 5A.

Figure 7:
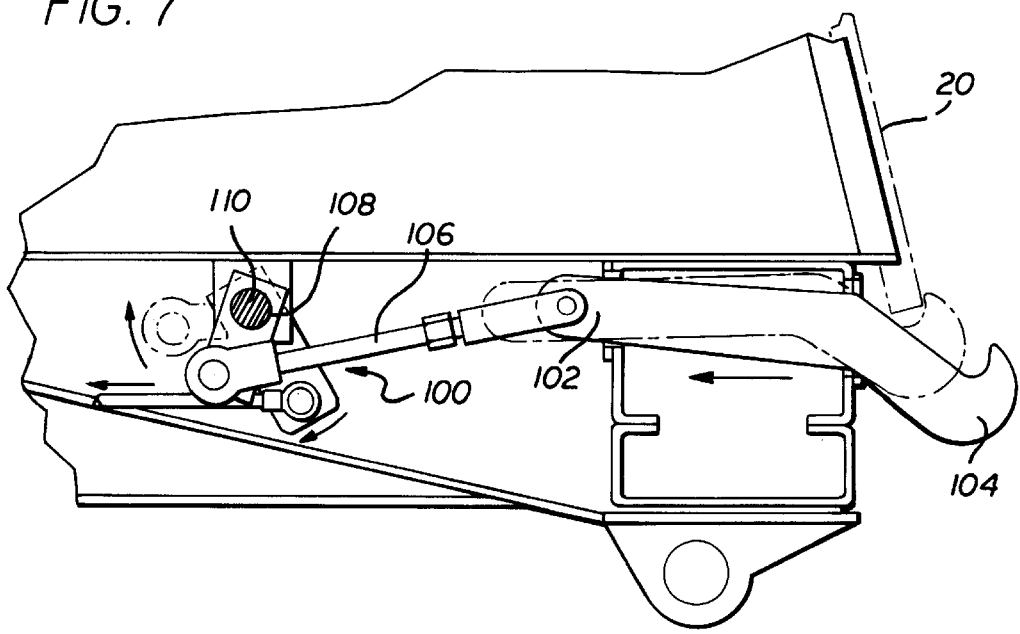
FIG. 7 is a sectional view, taken substantially on line 7—7 of FIG. 6, of apparatus for opening the tailgate to provide for the dumping of the load in the dump truck.

FIG. 7 shows an arrangement for releasing the tailgate 20 so that the tailgate can be pivoted on the pin 22 as a fulcrum. In FIG. 7, an arrangement generally indicated at 100 shown is in broken lines in a position in which the tailgate 20 is prevented from being opened. The arrangement 100 is shown in solid lines in FIG. 7 in a position in which the tailgate 20 can be opened to provide for the dumping of the load in the truck body 16 on the ground.

The arrangement 100 includes an actuator 102 with a hook 104 at one end for engaging the bottom end of the tailgate 20. At its opposite end, the actuator 102 is pivotably attached to one end of a push rod 106 having its other end coupled to a lever 108. The lever 108 is in turn pivotably coupled to a pin 110 which extends into the frame. When the lever 108 is rotated on the pin 110, it causes the actuator 102 to move from the position shown in broken lines in FIG. 7 as engaging the bottom of the tailgate to the position shown in solid lines in FIG. 7. In this position, the tailgate 20 is free to become opened for releasing the load in the truck body 16. The features shown in FIG. 7 and described in this paragraph may be considered to be in the prior art. It is included in this application to complete the disclosure.

FIG. 8 illustrates the electrical circuitry for moving the trailing tag axle assembly 70 and the wheels 72 between the storage and operative positions. FIG. 9 illustrates the hydraulic circuitry which operates in conjunction with the electrical circuitry shown in FIG. 8 to move the trailing tag axle assembly 70 and the wheels between the storage and operative positions. The construction and operation of the electrical circuitry shown in FIG. 8 and the hydraulic circuitry shown in FIG. 9 will be described in conjunction.

The circuitry shown in FIG. 8 includes two (2) switches which are respectively designated as "Switch 1" and "Switch 2". These switches are disposed on a control panel (not shown) in the cab 12 of the dump truck 10. The Switch 1 is a three (3) position switch which can be locked in each of the three (3) positions. These three (3) positions are respectively labelled as "Up", "Neutral" and "Down". The Switch 2 is also a three (3) position switch having its positions respectively labelled as "Manual", "Off" and "Auto". This switch is momentarily positioned in the "Manual" position and is locked in the "Off" and "Auto" positions. The Switches 1 and 2 and a pressure gauge also mounted on the control panel in the cab 12 control the positioning of the trailing tag axle assembly 70 and the wheels 72.

Assume that the trailing tag axle assembly 70 and the wheels 72 are in the up or storage position. To lower the trailing tag axle 70 from the storage position, the operator toggles switch 1 from the "Neutral" position to the "Down" position. Switch 2 is in the "Auto" position. This energizes solenoid valve #2 (SV2), solenoid valve #3 (SV3) and solenoid valve #4 (SV4). Solenoid valve #2 (SV2) and solenoid valve #3 (SV3) shift open and solenoid valve #4 (SV4) shifts closed. Solenoid valve SV4 is a dump valve, dumping pump flow back to tank (T). The oil leaving the pump (P) then passes through solenoid valve SV2 and check valve #2 (CV2) in the free flow direction and out port C1 into port VA of the sequence valve. Oil now flows through port C1A and into the head end of the cylinder 92, causing the pistons 88 to extend and toggling the wheels 72 into their operative position.

As the piston 88 is extending, the oil in the end of the piston 88 flows into the sequence valve through port C1B and through the check valve CV3 in the free flow direction and out port VB and into port C2. The return oil is blocked by check valve CV1, so it flows through SV3 back to tank (T). When the toggle piston 88 reaches the end of its stroke, the hydraulic pressure increases shifting the sequence valve on the C1A side at a pressure of (1000 psi). This directs the oil into port C2A and into the head end of the cylinders 28 in the hydraulic drives 26. The pressure in the head ends of the cylinders 92 in the hydraulic drives 86 remain at the sequence pressure (1000 psi). The lift pistons 30 extend. This causes the tag axle 70 to be lowered. The oil in the rod ends of the lift cylinder 28 flows into the dual sequence valve through port C2B and flows out port VB. The oil is blocked by check valve CV1 and passes through the solenoid valve SV3 on its way back to tank (T).

The lift cylinders 28 lower the trailing tag axle 70 until the wheels 72 reach the ground. At this point, the pressure in the hydraulic circuit (and port S) begins to increase as the accumulator is pumped up. The shuttle valve (LS1) is connected to both lines C1 and C2 and port S. The pressure at port S will be the greater of the pressures in C1 or C2. The pressure gauge and pressure switch (PS1) in the control box are connected to the circuit through port S. The normally closed pressure switch (PS1) keeps the solenoid valve SV4 energized. With the axle on the ground, the accumulator 48 is pumped up to 1500 psi. The pressure switch PS1 (set to open at 1500 psi) opens and de-energizes the solenoid valve SV4. The normally open solenoid valve SV4 now dumps the oil back to the tank T. The pressure switch PS1 has a detent such that the pressure switch PSI will not close until the pressure drops to about 1,200 psi. If the pressure drops somewhat, the solenoid valve SV4 will not shift until the pressure drops below 1,200 psi. This keeps the hydraulic circuit from hunting.

The lift cylinders 92 not only operate the trailing tag axle 70 upwardly and downwardly but they also serve as the suspension. This is well known in the prior art. To accomplish this, the hollow rods 30 are charged with nitrogen. The pistons inside the rods 30 move back and forth inside the rods. As the axle 70 moves upwardly and downwardly, the lift rods 30 extend and contract inside the cylinders 28. The excess oil pushes the pistons 38 toward the end of the rods. Nitrogen gas trapped between the pistons 38 and the ends of the rods 30 compresses, allowing this expansion to occur.

The prior art has always had difficulty in either limiting the pressure increases that occur as the gas is compressed between the pistons 38 and the ends of the rods 30 to a reasonable amount or has had difficulty in obtaining enough throw of the suspension. Assuming that the temperature of the gas remains substantially constant, the pressure increase is proportional to the volume decrease. Because of the limited volume inside the rods 30 in the prior art and the amount of stroke in the lift cylinders 28 for which the accumulator 48 must compensate, the pressure increases and thus the forces and stresses on the axle 70 have been substantial in the prior art. The accumulator 48 is also advantageous because the pressure of the fluid equalizes the pressure in lift cylinders 28. This results from the fact that the accumulator 48 is plumbed into the cylinders 30 at the opposite lateral ends of the accumulator.

This invention continues the use of the pistons 38 inside the rod 30, but the gas side of the pistons 38 is connected to the large external gas reservoir mounted inside the accumulator support tube 49. This allows the fast suspension action of the pistons 38. The large reservoir capacity of the accumulator 48 provides enough change in stroke of the lift rods 30 to permit the trailing tag axle 70 to drop into an eighteen (18) inch hole or move over a thirty six (36) inch bump while only increasing the forces one and one half (1.5) times the normal operating force. If the trailing tag axle 70 tries to go higher than thirty six (36) inches, the relief valve (RV1) opens to protect against higher forces than the axle is designed to take.

To raise the trailing tag axle 70, the operator toggles the switch 1 in FIG. 8 from the down or neutral position to the up position. This energizes the solenoid valve #1 (SV1), the solenoid valve #5 (SV5) and deenergizes the solenoid valve #4 (SV4). The solenoid valves SV1 and SV5 open and the solenoid valve SV4 closes. The oil leaving the pump (P) flows through the solenoid valve SV1, the check valve #1 (CV1) in the free flow direction and out port C2 and then into the sequence valve 2 through the port VB. From there the oil flows into the rod end of the lift cylinders 28 through the port C2B, causing the piston 30 to move into the cylinders 28 and raise the tag axle 70. As the pistons 30 move into the cylinders 28, the head end oil flows out through the port C2A, through the check valve in (CV4) in the free flow direction and out the port VA and into the port C1. The return oil is blocked by the check valve CV2 and flows through the solenoid valve SV5 to the tank (T).

When the lift pistons 30 reach the end of their stroke, the hydraulic pressure increases until the sequence valve shifts at a pressure of approximately one thousand pounds per square inch (1000 psi) and directs the oil into the port C1B and the rod end of the cylinder 92. The pressure in the rod ends of the lift cylinders 28 remains at 1000 psi. As the piston 88 moves into the cylinder 92, the trailing tag axle 70 is toggled into its up or storage position as shown in FIGS. 4A and 5A. As the piston 88 moves into the cylinder 92, the head end oil flows through the port C1A and is dumped out of the port VA into the port C1 and passes through the solenoid valve SV5 back to the tank (T).

Manual operation is used when the operator wants to put less load on the trailing axle assembly 24 than the maximum. In the "auto" mode, current is always provided to the pressure switch PS1. When the pressure comes up to 1500 psi, the pressure switch PS1 opens. In the manual mode, the operator pushes the momentary switch 2 to manual. This energizes the solenoid valve SV4. The operator watches the pressure gauge in the cab until the trailing axle is pressured up to the desired pressure. The operator then releases the momentary switch 2 which returns to the "Off" position. In this manner, the operator can set the pressure at the trailing axle assembly 24 to whatever is required less than the maximum which is controlled by the pressure switch PS1.

The trailing tag axle assembly 24 has certain important advantages. It provides for the attachment of the trailing tag axle assembly 28 to the side panels 18 of the dump truck 10 without bowing the frame 14 away from the truck body. It provides for the full use of the distance between the rear wheels 98 of the dump truck 10 and the wheels 72 in the trailing tag axle assembly in distributing the weight of the load in the truck body 16 between the front wheels on the dump truck 10 and the wheels 72. It provides for a smooth and efficient movement of the tag axle assembly 24 over bumps and dips such as potholes in the road when the trailing tag axle assembly is in the operative position with the wheels 72 on the road and when the dump truck 10 is travelling along the road. When the wheels 72 move over bumps or into dips in the road, the changes in force are limited because of the large reservoir provided by the accumulator 48. This tends to assure long life in the operation of the trailing axle assembly 24.

The trailing tag axle assembly 24 minimizes the height of the trailing tag axle assembly above the ground when the tag axle assembly is in the storage position. It also provides for the dumping of the load in the truck body 16 without any obstruction from the trailing tag axle assembly when the trailing tag axle assembly is in the storage position. The trailing tag axle assembly 24 is also advantageous because it can balance uneven loads on the opposite lateral sides of the truck body when the trailing tag axle assembly is in the operative position on the ground. This results from the balancing action of the gas in the accumulator 48.

Although this invention has been disclosed and illustrated with reference to particular embodiments, the principles involved are susceptible for use in numerous other embodiments which will be apparent to persons skilled in the art. The invention is, therefore, to be limited only as indicated by the scope of the appended claims.

We claim:

1. In a combination for use with a dump truck to extend the effective length of the dump truck for increasing the load that the dump truck can carry while travelling along a road, the dump truck having side walls, a trailing tag axle assembly having a trailing tag axle and wheels disposable on the road for increasing the load that the dump truck can carry while travelling along the road, first means for coupling the trailing tag axle assembly to the side walls of the dump truck, second means for providing for a pivotal movement of the trailing tag axle assembly relative to the side walls of the dump truck between a lowered position providing for the disposition of the trailing tag axle assembly on the road and a raised position providing for the disposition of the trailing tag axle assembly above the dump truck, and third means providing for a pivotal movement of the trailing tag axle assembly between a first position above the dump truck and a second position above the dump truck.

2. In a combination as set forth in claim 1, the dump truck having a tailgate movable between a first position closing the rear end of the dump truck and a second position opening the rear end of the truck, the first, second and third means being disposed relative to the tailgate in the second position of the tailgate and the positioning of the trailing tag axle assembly in the raised position by the second means and the positioning of the trailing tag axle assembly by the third means in the second position above the dump truck to provide for the dumping of the load in the dump truck without any obstruction by the first, second or third means.

3. In a combination as set forth in claim 1, a fourth means for providing for an operation of the third means from the second position of the trailing tag axle assembly above the dump truck to the first position of the trailing tag axle assembly above the dump truck and then for an operation of the second means for moving the trailing tag axle assembly from the raised position to the lowered position with the wheels on the trailing tag axle assembly initially above the dump truck and for providing for an operation of the second means from the lowered position of the trailing tag axle assembly to the raised position of the trailing tag axle assembly and then for an operation of the third means from the first position above the dump truck to the second position of the trailing tag axle assembly above the dump truck with the wheels on the trailing tag axle assembly initially on the ground.

4. In a combination as set forth in claim 1, a fourth means associated with the second means for providing for a movement of the trailing tag axle assembly by the second means to accommodate bumps and dips in the road to obtain a smooth movement of the trailing tag axle assembly while the dump truck is travelling along a road having bumps and dips in the road.

5. In a combination for use with a dump truck to extend the effective length of the dump truck for increasing the load that the dump truck can carry while travelling along a road, the dump truck having a pair of side walls spaced from one another at opposite lateral ends of the dump truck, a trailing tag axle, a pair of arms, first means for attaching each of the arms in the pair to an individual one of the side walls in the dump truck for pivotal movement relative to such side walls, second means operatively coupled to the arms and to the side walls of the dump truck for providing a pivotal movement of the trailing tag axle between a lowered position providing for a disposition of the trailing tag axle on the road and a raised position disposing the trailing tag axle above the dump truck, wheels attached to the trailing tag axle, and third means operatively coupled to the trailing tag axle and the second means for pivoting the trailing tag axle and the wheels between a first position providing for a disposition of the wheels on the ground with the trailing tag axle moved to the lowered position by the second means and a second position providing for a reduction in the height of the tag axle and the wheels above the dump truck with the trailing tag axle pivotably moved to the raised second position by the second means.

6. In a combination as set forth in claim 5, fourth means disposed in coupled relationship to the pair of arms for balancing the relative disposition of the arms in the pair.

7. In a combination as set forth in claim 5, fourth means associated with the second means for compensating for the operation of the second means in providing for a smooth movement of the wheels on the road when the road has bumps and dips and the dump truck is travelling along the road with the wheels disposed on the road.

8. In a combination as set forth in claim 6, fifth means disposed in co-operative relationship with the second means and the fourth means for compensating for the operation of the second means in providing for a smooth movement of the wheels on the road when the road has bumps and dips and the dump truck is travelling along the road with the wheels disposed on the road.

9. In a combination as set forth in claim 5 wherein the dump truck has a tailgate movable to a position for opening the dump truck for a dumping of the load, the arms and the second means in the second position of the trailing tag axle and the third means in the second position of the trailing tag axle being disposed to provide for the dumping of the load from the dump truck without any obstruction from the arms, the first means, the second means, the third means, the trailing tag axle and the wheels with the tailgate in the position opening the dump truck for the dumping of the load.

10. In a combination as set forth in claim 9, fourth means disposed in coupled relationship to the pair of arms for balancing the relative disposition of the arms in the pair, and fifth means operatively coupled to the second means and the fourth means for compensating for the operation of the second means to provide for a smooth movement of the wheels on the road when the road has bumps and dips and when the dump truck is travelling along the road.

11. In a combination for use with a dump truck to extend the effective length of the dump truck for increasing the load that the dump truck can carry while traveling along a road, lift arms having first and second ends and attached at the first end to the dump truck at the opposite lateral ends of the dump truck, hydraulic drive means having first and second ends and operatively coupled at their first ends to the opposite lateral ends of the dump truck at positions spaced from the first ends of the arms and operatively coupled at their second ends to the second ends of the lift arms for raising the second ends of the lift arms above the dump truck and for lowering the second ends of the lift arms to a position near the road, a trailing tag axle, wheels disposed on the trailing tag axle, and first means operatively coupled to the trailing tag axle and to the lift arms and the drive means for moving the trailing tag axle and the wheels relative to the lift arms and the drive means to a first position providing for a disposition of the wheels on the ground with the lift arms in the position near the road and to a second position providing for a raising of the trailing tag axle and the wheels relative to the lift arms with the lift arms in the raised position above the dump truck.

12. In a combination as set forth in claim 11, second means operatively coupled to the drive means and to the first means for providing an operation of the drive means for moving the lift arms only when the trailing tag axle and the wheels are in the first position.

13. In a combination as set forth in claim 11, the first means and the drive means being constructed to reduce the amount of force of the drive means and the first means for moving the trailing tag axle and the wheels between the first and second positions with progressive movements of the lift arms from the raised position to the lowered position.

14. In a combination as set forth in claim 11, the lift arms, the drive means and the first means being constructed and disposed such that in the raised position of the lift arms and the second position of the trailing tag axle and the wheels there is provision for a dumping of the load from the dump truck without any obstruction from the lift arms, the drive means and the first means in the second position of the lift arms.

15. In a combination as set forth in claim 11, second means disposed between the lift arms for balancing the movements of the lift arms between the raised and lowered positions, and third means disposed in the lift arms and including the second means for facilitating the movements of the trailing tag axle and the wheel over bumps in the road and into dips in the road with the trailing tag axle in the first position.

16. In a combination as set forth in claim 15, the second means being operatively coupled to the drive means and to the first means for providing an operation of the third means to move the trailing tag axle and the wheels between the first and second positions only when the lift arms are in the raised position, the second means being operatively coupled to the drive means and to the first means for providing an operation of the drive means for moving the pair of lift arms only when the trailing tag axle and the wheel are in the first position, the first means and the drive means being constructed to reduce the amount of force of the drive means on the first means for moving the trailing tag axle and the wheels between the first and second positions with progressive movements of the lift arms from the raised position to the lowered position, and the lift arms, the hydraulic means and the first means being constructed and disposed in the raised position of the lift arms and the second position of the trailing tag axle and the wheels to provide for a dumping of the load from the dump truck without any obstruction from the lift arms, the hydraulic means and the second means in the first position of the lift arms.

17. In combination, a dump truck movable along a road and constructed to carry a load and having a tailgate movable to open the dump truck for the dumping of the load and having a pair of side panels at opposite lateral ends of the dump truck, a trailing tag axle, wheels on the trailing tag axle, first means operatively coupled to the trailing tag axle and the side panels of the dump truck for moving the trailing tag axle and the wheels between a lowered position providing for a disposition of the wheels on the road and a raised position providing for a disposition of the trailing tag axle and the wheels above the dump truck, and second means operatively coupled to the trailing tag axle and the first means for providing for a movement of the trailing tag axle and the wheels between a first position providing for a disposition of the wheels on the road and a second position providing for the disposition of the trailing tag axle and the wheels in a stored relationship with the first means above the dump truck.

18. In a combination as set forth in claim 17, third means operatively coupled to the dump truck and the tailgate for opening the tailgate to provide for a dumping of the load from the dump truck, the first and second means, the trailing tag axle and the wheels being disposed relative to the opening in the dump truck to provide for the dumping of the load from the dump truck, with the first means disposing the trailing tag axle in the raised position and the second means disposing the trailing tag axle in the second position, without any obstruction from the trailing tag axle, the wheels, the first means or the second means.

19. In a combination as set forth in claim 18, the dump truck having a truck body for holding the load and the side panels being disposed on the truck body, fourth means for tilting the truck body to facilitate the dumping of the load from the truck body with the tailgate open, and the first means, the second means, the trailing tag axle and the wheels being disposed relative to an opening in the truck body to provide for the dumping of the load from the truck body with the first means disposing the trailing tag axle in the second position and the second means disposing the tag axle in the second position and the truck body tilted and the tailgate open.

20. In a combination as set forth in claim 17, third means for providing a movement of the first means between the raised and lowered positions of the trailing tag axle with the second means stationary and a movement of the second means between the first and second positions of the trailing tag axle with the first means stationary.

21. In a combination as set forth in claim 17, third means for balancing the operation of the first means during the movement of the trailing tag axle and the wheels between the raised and lowered positions, and fourth means for modifying the response of the first means to bumps and dips in the road to maintain the disposition of the wheels on the road while the wheels are travelling over the bumps and into the dips with the first means in the lowered position of the trailing tag axle and the second means in the first position of the trailing tag axle.

22. In a combination as set forth in claim 17, third means for providing for a movement of the trailing tag axle and the wheels initially by the second means from the second position of the trailing tag axle to the first position of the trailing tag axle and subsequently by the first means from the raised position to the lowered position for a displacement of the trailing tag axle and the wheels from the position above the dump truck to a position providing for the disposition of the wheels on the road and for providing for a movement of the trailing tag axle and the wheels initially by the first means from the lowered position of the trailing tag axle to the raised position of the trailing tag axle and subsequently by the second means from the first position of the trailing tag axle to the second position of the trailing tag axle for a displacement of the trailing tag axle and the wheels to a position above the dump truck in a stored relationship to the dump truck, fourth means operatively coupled to the dump truck and the tailgate for opening the tailgate to provide for a dumping of the load from the dump truck, the first and second means, the trailing tag axle and the wheels being disposed relative to the opening in the dump truck to provide for the dumping of the load from the dump truck with the first means in the raised position of the trailing tag axle and the second means in the second position of the trailing tag axle, the dump truck having a truck body and the side panels being disposed on the truck body, fifth means for tilting the truck body to facilitate the dumping of the load from the truck body with the tailgate open, and the first means, the second means, the trailing tag axle and the wheels being disposed relative to the opening in the truck body to provide the dumping of the load from the dump truck, with the first means in the raised position of the trailing tag axle and the second means in the second position of the trailing tag axle and the dump truck body tilted and the tailgate open, without obstructing the passage of the load from the dump truck, sixth means for balancing the operation of the first means during the movement of the first means between the raised and lowered positions of the trailing tag axle, and seventh means for modifying the response of the first means to bumps and dips in the road to maintain the disposition of the wheels on the road while the wheels are travelling over the bumps and into the dips in the road.

23. In combination, a dump truck constructed to carry a load and having a frame and opposite lateral sides, lift arms, drive means, first means for attaching the lift arms and the drive means to the opposite lateral sides of the dump truck to provide for a raising and lowering of the lift arms by the drive means without any buckling of the frame, the lift arms being liftable to a position above the dump truck, second means for operating the drive means to obtain a lifting and lowering of the lift arms, a trailing tag axle, wheels supported by the trailing tag axle, and third means operatively coupled to the trailing tag axle and the first means for providing a movement of the trailing tag axle and the wheels relative to the lift arms between a first position providing for a disposition of the wheels on the road and a second position providing for a lowering of the tag axle and the wheels relative to the lift arms with the lift arms disposed above the truck.

24. In a combination as set forth in claim 23, the lift arms and the drive means being pivotably disposed relative to the dump truck, the second means providing for a pivotal movement of the trailing tag axle and the wheels between the raised and lowered positions of the lift arms.

25. In a combination as set forth in claim 23, the drive means constituting first drive means, the third means including second drive means for moving the trailing tag axle and the wheel between the first and second positions, the third means being constructed to maintain the trailing tag axle and the wheels in the first position without any hydraulic force from the second drive means.

26. In a combination as set forth in claim 23, the dump truck being constructed to carry a load and having a tailgate to provide for an opening of the dump truck to provide for a dumping of the load from the tailgate, fifth means disposed on the dump truck for opening the tailgate, the lift arms, the drive means, the first means, the second means, the trailing tag axle, the wheels and the third means being constructed and disposed relative to the opening in the dump truck to provide for a passage of the load through the opening in the dump truck without any obstruction with the lift arms in the raised position.

27. In a combination as set forth in claim 23, the dump truck having a bed and having a body pivotable relative to the bed to facilitate the dumping of the load through the opening in the dump truck, the lift arms, the drive means, the first means, the second means, the trailing tag axle, the wheels and the third means being constructed and disposed relative to the opening in the dump truck, with the body in the pivoted relationship and the lift arms in the raised position, to provide for the passage of the load through the opening in the dump truck without any obstruction.

28. In a combination as set forth in claim 27, the lift arms and the drive means being pivotably disposed relative to the truck body, the second means providing for a pivotal movement of the trailing tag axle and the wheels between the raised and lowered positions, the drive means constituting first drive means, the third means including second drive means for moving the trailing tag axle and the wheel between the first and second positions, the third means being constructed to maintain the trailing tag axle and the wheels in the first position in the lowered position of the lift arms without any force from the second drive means.

29. In a combination set forth in claim 23, the fourth means being constructed to reduce the force for moving the trailing tag axle and the wheels between the first and second positions with progressive movements of the trailing tag axle and the wheel toward the second position.

30. In a combination for use with a dump truck to extend the effective length of the dump truck for increasing the load that the dump truck can carry while travelling along a road, the dump truck having a frame, lift arms, drive means, first means for attaching the lift arms and the drive means to the dump truck for a movement of the lift arms and the drive means between raised and lowered positions without bending the frame, the lift arms being above the dump truck in the raised position, second means operatively coupled to the lift arms and the drive means for providing a movement of the lift arms and the drive means between the raised and lowered positions, a trailing tag axle, rotable wheels disposed on the trailing tag axle, third means for disposing the trailing tag axle on the lift arms for movement of the trailing tag axle relative to the lift arms between first and second positions, the first position providing for a disposition of the trailing tag axle and the wheels on the ground and the second position providing for a storage of the trailing tag axle and the wheels above the dump truck in a low profile position relative to the road, linkage means operatively coupled to the lift arms and the drive means and the trailing tag axle for providing for the movement of the trailing tag axle and the wheels relative to the lift arms between the first and second positions, and second drive means operatively coupled to the trailing tag axle and the linkage means for operating upon the linkage means to obtain the movement of the trailing tag axle and the wheels relative to the lift arms between the first and second positions.

31. In a combination as set forth in claim 30, the second drive means being disposed relative to the linkage means in the first position of the trailing tag axle and the wheels to maintain the trailing tag axle and the wheels in the first position, with the trailing tag axle and the wheels in the lowered position, without substantially any force from the second drive means.

32. In a combination as set forth in claim 29, the linkage means including a pair of linkages pivotable relative to each other in accordance with the operation of the second drive means to move the trailing tag axle between the first and second positions.

33. In a combination as set forth in claim 30, the linkage means including a pair of linkages pivotable relative to each other in accordance with the operation of the second drive means to move the trailing tag axle and the wheels between the first and second positions, the linkages being disposed in a linear relationship to each other in the first position of the trailing tag axle and the wheels to maintain the trailing tag axle and the wheels in the first position without substantially any force from the second drive means.

34. In a combination for use with a dump truck to extend the effective length of the dump truck for increasing the load that the dump truck can carry while travelling along a road, lift arms attached to the dump truck at the opposite lateral sides of the dump truck, drive means attached to the dump truck at the opposite lateral sides of the dump truck, first means operatively coupled to the lift arms and the drive means for providing a movement of the lift arms and the drive means between raised and lowered positions, second means for balancing the operation of the lift arms and the drive means during the raising and lowering of the lift arms and the drive means, a trailing tag axle, rotatable wheels disposed on the trailing tag axle, and third means operatively coupled to the trailing tag axle and the wheels for moving the trailing tag axle and the wheels between an operative position with the lift arms and the drive means in the lowered position and a storage position with the trailing tag axle and the wheels extending forwardly along the dump truck when the lift arms and the drive means are in the raised position.

35. In a combination as set forth in claim 33, means operatively coupled to the second means and the drive means for accommodating the positions of the drive means and the lift arms in the lowered positions of the drive means and the lift arms to provide a movement of the wheels over bumps and into dips in the road when the dump truck is travelling along the road.

36. In a combination as set forth in claim 33, the drive means including hydraulic cylinders and hollow rods in the hydraulic cylinders, a pneumatic fluid being disposed in the rods and the second means including a hollow accumulator with fluid in the accumulator, the hollow accumulator extending between the rods, and fourth means for providing a pneumatic coupling between the hollow accumulator and the hollow rods to provide for a passage of the pneumatic fluid between the hollow accumulator and the hollow rods in accordance with the movement of the dump truck over bumps and into dips in the road.

37. In a combination as set forth in claim 33, the truck having side panels and a frame, and the drive means and the lift arms being attached to the side panels of the dump truck to avoid any bending of the frame during the movement of the lift arms and the drive means between the raised and lowered positions.

38. In a combination as set forth in claim 35, the drive means constituting first hydraulic drive means, the dump truck having side panels and a frame, the first hydraulic drive means and the lift arms being attached to the side panels of the dump truck to avoid any bending of the frame during the movement of the lift arms and the first hydraulic drive means between the raised and lowered positions, and the third means including linkage means and second hydraulic drive means operatively coupled to the lift arms and the first hydraulic drive means and to the trailing tag axle and the wheels for moving the tag axle and the wheels between the operative and storage positions.

* * * * *